United States Patent Office 2,897,829
Patented Aug. 4, 1959

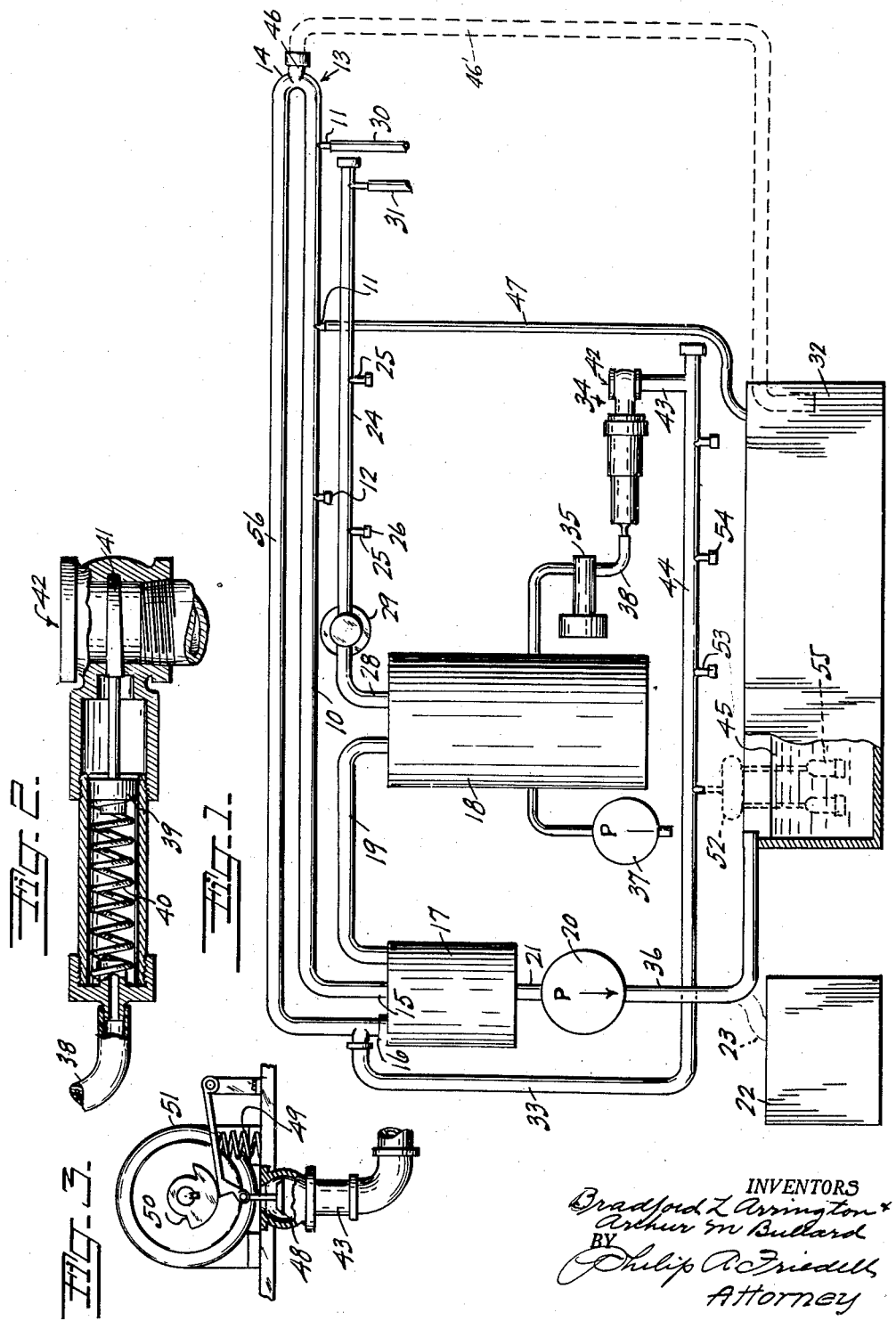

2,897,829

MEANS FOR CLEANING IN-PLACE PIPE LINES

Bradford L. Arrington and Arthur M. Bullard, Petaluma, Calif., assignors to Holm Tractor & Equipment Company, Petaluma, Calif.

Application May 28, 1954, Serial No. 433,242

5 Claims. (Cl. 134—99)

This invention relates to improvements in means for washing or cleaning installed pipe lines, and has particular reference to milking lines which require cleaning and sterilization following the completion of each milking operation, though it can as readily be used or adapted for cleaning chemical, oil or similar pipe lines.

This cleaning system involves the delivery of a predetermined volume of water or solution into the pipe line, passing air through that specific volume while permitting a partial return flow, interrupting the passage of air and return flow previous to complete discharge and simultaneously delivering a second volume with interposed air space between the two volumes, passing air through both volumes while permitting partial return flow of both volumes, again interrupting air passage and return flow, and continuing uninterruptedly through a series of these cycles, thus causing a scrubbing and surging and resurging action with separate following volumes of solution which change continuously from quiescent to foaming, thus providing an unusual and very effective cleansing action.

A manifold is provided for attachment of the milking machines, through which the cleaning fluid is drawn and partly discharged in a series of surges, the fluid then passing to the milk or combined milk and vacuum line, thus cleaning the entire milking circuit in a single operation.

The washing and sterilizing operation is relatively rapid and simple and entirely automatic with the exception of that of starting and stopping operation of the apparatus, and the mixing or preparing of the proper solutions.

The apparatus for carrying out this automatic operation is relatively simple, consisting merely of a valve and operating means therefor and which may be the vacuum source, for making and breaking a vacuum.

The objects and advantages of the invention are as follows:

First, to provide a system for cleaning in-place pipe lines in which a cleaning solution is delivered into the pipe line in predetermined amount, delivery interrupted and the solution partly discharged and the remainder aerated, discharging terminated as also aeration, followed by a series of similar cycles, with each volume within the pipe following the preceding volume with intervening space.

Second, to provide a system for cleaning as outlined in which sub-atmospheric pressure is used for delivery of the cleaning solution, and admission of air under atmospheric pressure is used for terminating delivery and aerating and foaming the solution within the pipe line.

Third, to provide means for carrying out the series of cycles of operations in the form of a valve and operating means therefor for alternately making and breaking the vacuum to cause intake of a volume of solution, then passing air through the volume of solution while a portion of the volume returns, re-drawing the volume and de-aerating through a renewed vacuum and simultaneously taking in a second volume in spaced relation to the first volume to create a continuous series of washings within the pipe line.

In describing the invention reference will be had to the accompanying drawings, in which:

Fig. 1 illustrates a milking line and apparatus with the invention applied thereto.

Fig. 2 is a section through a make and break valve suitable for operation of this invention.

Fig. 3 illustrates one modification of the make and break valve.

The conventional milking circuit includes a milking line 10, which is normally a single line, but which in this case is illustrated as a circuit line providing for more thorough washing of the line with greater volumes of washing solution, but also provides for greater capacity or greater length of main line for milking, the capacity being twice that of a single line and can therefore be extended twice the distance.

A milking machine connection 11 is provided for each milking stall, the unused connections being simply closed as by rubber caps 12 which may be removed or partly retracted during the washing period for admission of additional air at will, the initial end at 13 being normally closed though under certain conditions may be only partly closed to admit air. The initial end in this case is in the form of a return bend 14, the terminal ends 15 and 16 being both in communication with the separator bottle 17 which in turn has communication with the vacuum tank 18 through the connection 19, and, with the milk pump 20 through the connection 21, the milk pump discharging into a storage tank 22 as indicated by the dotted pipe portion 23.

The pulsating line for the milking machines is shown at 24, and also has a connection 25 for each milking stall, the unused connections being suitably sealed as by rubber caps 26, this line being sealed at its terminal end as indicated at 27, with the other end in communication with the vacuum tank as indicated at 28. This pulsating line is provided with a pulsator 29, or, individual pulsators are provided for each of the separate milking machines for pulsating action of the teat cups, thus one connection 30 is connected to the teat cup while the other connection 31 is connected to the shell or vacuum cup.

The invention includes a wash solution tank 32, a connection 33 from the milk line to the solution tank, a vacuum make and break valve 34 in communication with the wash connection 33, and means such as a pulsator 35 for operating the valve, the wash line 33 being either disconnectable or capable of being closed off. The connection 36 from the milk pump, and/or releaser is arranged to permit discharge of the wash solution to the tank 32, a vacuum pump 37 maintaining a vacuum within the entire system down to the milk pump 20.

The valve illustrated in Fig. 2 illustrates only one form in which this valve can be made, and is vacuum actuated, so that no auxiliary source of power is required for its operation. The pulsator, of conventional make, indicated at 35 making and breaking the vacuum to the valve cylinder through the connection 38, the piston 39 being retracted against the urgence of the spring 40, and upon breaking of the vacuum through the pulsator, the spring forces the piston to the position shown.

When retracted, the gate valve 41 is wide open admitting a copious volume of air at 42 thence through the connection 43 to the suction wash line manifold 44, or if the circuit is not to include a manifold, then to the line 33, the terminal end of which would then be depended into the solution 45 with the connection 43 connected above the solution. The connection 33 as shown is most desirable when milking units are to be washed, with a second connection 47 being made from the tank 32 to another point on the milk line such as to one of the nipples 11 through the conduit 47 or to the nipple 46 through the conduit 46' shown in dotted lines as an alternative, depending on the arrangement of the apparatus, length of line, and the purpose for which the pipe line is used.

The modification shown in Fig. 3 consists of a poppet valve 48 which is normally closed by a spring 49, and opened by a cam 50 on a speed reduction motor 51.

The operation of the invention is as follows: The milk pump 20 and vacuum pump 37 are operated normally, creating a vauum in the separator bottle 17, milk line 10, and vacuum line 24. The washing connection 33 with its manifold is connected to the milk line, and the connection 36 is switched from the milk storage container 22 to the wash tank 32, the tank 32 being provided with a supply 45 of washing solution, and the milking machines 52 are connected to the manifold connections 53, the unused connections being sealed off as by the caps 54, the teat cups 55 being lowered into the solution 45.

The motor 51, or the pulsator 35 is adjusted to provide make and break for the most suitable cycle, varying from cycles of 1 second to 1 minute, depending on the diameter and length of line to be cleaned as also the specific type of line and the type of cleaning solution used.

Considering a relatively short line subjected to a vacuum make and break cycle of 2 seconds, and considering the vacuum actuated and pulsator controlled valve shown in Fig. 2, the pulsator maintains the vacuum in the cylinder 39 for one second, keeping the valve 41 open and admitting air to the terminal end of the manifold, thus breaking the vacuum and allowing a portion of the solution to flow back to the tank 32. The pulsator then breaks the vacuum to the cylinder and the spring 40 closes the valve 41, making the vacuum in the entire system, drawing solution through the teat cups 55, thence through the manifold and into the milk line, the solution forming a solid volume in the pipe.

At the end of one second, the pulsator again opens the valve 41, admitting air at atmospheric pressure which is drawn through the solution in the pipe, retarding its return and causing frothing with a portion of the solution flowing back to the tank. With the next closing of the valve, the solution in the pipe is drawn together and defrothed and carried forward, with another volume of solution following in spaced relation, thus providing frothing and de-frothing accompanied by back and forth surges of spaced volumes of cleaning solution. The return line 56 is disconnectable at 16 for connection to the manifold line 33 unless the manifold connection is made at the connection 46 at the bend, or if connections 47 are used.

We claim:

1. An in-place pipe line cleaning system comprising a solution container, a communicating connection from said solution container to said pipe line, a source of subatmospheric pressure in communication with said pipe line, a make-and-break valve in communication with said communicating connection, operating means for actuating said valve through a series of cycles including closing said valve for making vacuum for drawing a volume of solution into said communicating connection and said pipe line and opening said valve for breaking the vacuum for admitting atmospheric air through said volume for release for return flow of a portion of said volume and thereby creating frothing therein, with the following closing of said valve regathering and advancing the remainder of said volume and drawing in another volume of solution in spaced relation to said remainder, and a discharge connection in communication with said container, and a pump in communication with said pipe line for discharging the remainders of the volumes back to said container following surging travel through the pipe line.

2. A cleaning system for in-place pipe lines comprising, a solution container and a supply of solution therein, a source of subatmospheric pressure in communication with said pipe line, a communicating connection from said pipe line to said container, a valve in communication with said pipe line and having a normally closed air inlet, a pulsator, a communicating connection from said pulsator to said source of subatmospheric pressure, said pulsator actuating said valve for opening and closing through a series of cycles of less than four seconds per cycle, with said source of subatmospheric pressure drawing a volume of solution into said pipe line when said valve is closed, followed by opening of the valve to admit air at atmospheric pressure to break the vacuum in the pipe line for discharge of a portion of the volume back to the container and simultaneously frothing the volume with the remaining portion of the volume being retained, retracted, and defrothed upon closing of said valve, and followed by additional volumes of solution subjected in sequence to the actions described for the initial volume, whereby the pipe line is subjected to a continuous series of intakes, washes, frothing, and partial discharges with the respective remaining portions of the volumes operating independently in spaced relation within the pipe line.

3. A washing system for a milking system having a separator bottle and a milk line in communication therewith, a source of subatmospheric pressure in communication with said separator bottle, comprising, discharge means from said separator bottle, a container for washing solution to receive said discharge, a manifold in communication with said milk line, said manifold having a series of milking unit connecting nipples for attachment of milking units for washing with the teat cups of the milking units suspended in the solution for intake and discharge of solution to and from said manifold and the connecting milk line, a valve having a normally closed air inlet and in communication with said manifold, a pulsator having connection with said source of subatmospheric pressure for operation and having connection with said valve for operation for opening the valve to admit air, with said pulsator operating said valve for operation of said washing system through a series of cycles for sequentially sucking in a volume of solution while the valve is closed, opening of the valve admitting a volume of air to break the vacuum to admit air to cause frothing of the volume and simultaneously releasing a portion of the volume for discharge back to the container with the remaining portion of the volume retained and advanced and defrothed upon closing of the valve, and with each succeeding volume in following relation to the previous remaining portion subjected to the recited reactions, thereby creating an intense series of surges and frothing for thorough cleaning of the milk line.

4. A cleaning system comprising, an in-place pipe line to be cleaned, a solution container having a washing solution therein, a communicating connection from each end of said pipe line to said solution container, a source of subatmospheric pressure in communication with said pipe line, an atmospheric air admission valve, a second communicating connection from said atmospheric air admission valve to the lower terminal portion of one of said first mentioned communicating connections, timing means and operating means therefor for opening and for closing said valve through a series of cycle of not more than four seconds per cycle for suctioning a volume of solution into said pipe line while the valve is closed, and admitting air under atmospheric pressure to break the vacuum and pass air through the said volume to create frothing while permitting a portion of the volume to return to the container during the brief open period of the volume, for each cycle, the remaining portion of the volume being defrothed while another volume is being suctioned, in each succeeding cycle.

5. A cleaning system as defined in claim 4, means for timing and operating said valve through a series of cycles comprising, a plunger, a cylinder, a spring urged piston operative in said cylinder and having connection with said plunger, said plunger including valve closure means, a pulsator having connection to said cylinder and to said source of subatmospheric pressure for retracting said piston for opening the valve for admission of air, and for releasing said piston for closing the valve, through a series of cycles, for the purposes described.

References Cited in the file of this patent

UNITED STATES PATENTS

| | | |
|---|---|---|
| 1,194,542 | Raymond | Aug. 15, 1916 |
| 1,613,185 | Mitchell | Jan. 4, 1927 |
| 1,645,356 | Shurts | Oct. 11, 1927 |
| 2,233,852 | Schmitt | Mar. 4, 1941 |
| 2,493,120 | Eaton | Jan. 3, 1950 |
| 2,598,963 | Armstrong | June 3, 1952 |
| 2,603,227 | Paxton | July 15, 1952 |
| 2,622,605 | Brooks | Dec. 23, 1952 |
| 2,680,445 | Hemminger | June 8, 1954 |
| 2,730,992 | Kessler | Jan. 17, 1956 |
| 2,733,667 | Hill | Feb. 7, 1956 |
| 2,779,308 | Gallistel | Jan. 29, 1957 |